United States Patent [19]

Young

[11] 4,448,391

[45] May 15, 1984

[54] SQUEEZE GRIP VALVE

[76] Inventor: Richard E. Young, 625 Coney Island Dr., Sparks, Nev. 89431

[21] Appl. No.: 481,790

[22] Filed: Apr. 4, 1983

[51] Int. Cl.³ .............................................. F16K 31/44
[52] U.S. Cl. .................................... 251/263; 251/251
[58] Field of Search ............................... 251/251, 263

[56] References Cited

U.S. PATENT DOCUMENTS

| | | | |
|---|---|---|---|
| 2,884,004 | 4/1959 | Dierdorf | 251/263 |
| 2,942,622 | 6/1960 | Hahn et al. | 251/263 |
| 3,016,929 | 1/1962 | Rapaport | 251/263 |
| 3,249,123 | 5/1966 | Berg | 251/263 |
| 3,614,657 | 10/1971 | Hospe | 251/251 |

*Primary Examiner*—A. Michael Chambers
*Attorney, Agent, or Firm*—Julian Caplan

[57] ABSTRACT

A handle mounted adjacent one end of a centrally bored body when squeezed toward the body turns a stem through about 22°. The interior of the stem is cut away so that all that remains is a 90° sector which functions as a cam. On the opposite end of the body is an inlet port. A reciprocable actuator has a seat at one end which is biased to close the inlet port. The opposite end of the actuator engages the cam. Vanes on the actuator center the actuator relative to the bore of the body and permit fluid to pass from the port past the stem when the handle is depressed. When the handle is up, the cam is positioned so that the end of the actuator moves forward by spring and water pressure force to close the valve. When the handle is depressed, the cam turns to force the stem back to unseat the valve and because the stem is cut away for approximately 270°, fluid flows around the stem and out of the discharge port.

2 Claims, 6 Drawing Figures

U.S. Patent    May 15, 1984    4,448,391
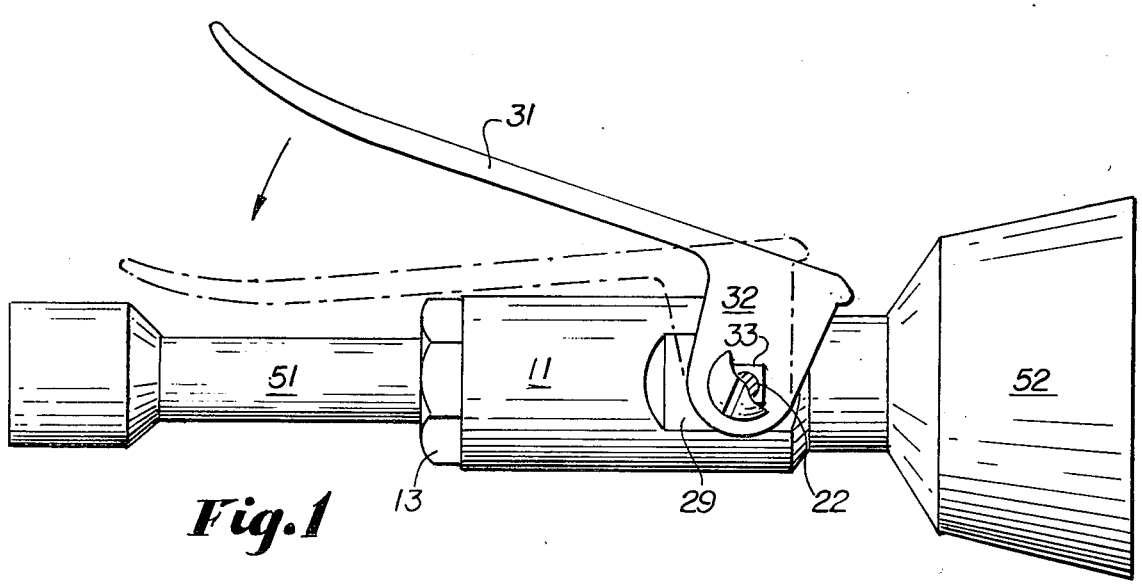
Fig. 1
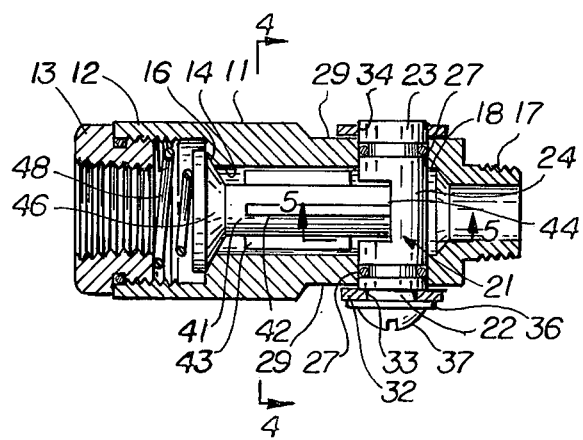
Fig. 2
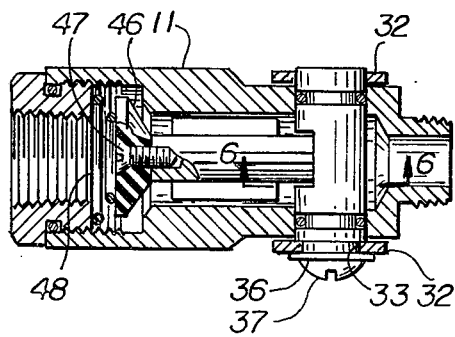
Fig. 3
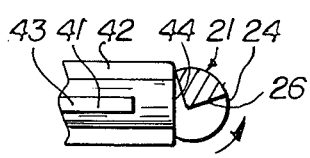
Fig. 6
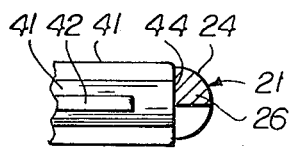
Fig. 5
Fig. 4

SQUEEZE GRIP VALVE

This invention relates to a new and improved squeeze grip valve. One preferred use for such valve is in spray safety equipment where water or chemicals are sprayed on the eye or face of a workman who has come in contact with a toxic substance. Other uses for the valve will be readily apparent to those skilled in the art.

One of the problems with prior valves used for the same purpose is that two hands were required, one to hold the nozzle and the other to open the valve. The present invention is superior to such prior constructions in that only one hand is required.

Still another feature and advantage of the present invention over prior valves of this general type is that it is extremely quick operating. In times of danger of contamination with toxic substance, time is of the essence.

Still another feature and advantage of the present invention over prior valves is that the body of the valve and the handle which opens the valve are compact, and easily assembled and disassembled.

Other objects of the present invention will become apparent upon reading the following specification and referring to the accompanying drawings in which similar characters of reference represent corresponding parts in each of the several views.

In the drawings

FIG. 1 is a side elevational view of a valve in accordance with the present invention;

FIG. 2 is a vertical mid-sectional view of the valve body showing the valve in closed position;

FIG. 3 is a view similar to FIG. 2 showing the valve in open position;

FIG. 4 is a transverse sectional view taken substantially along the line 4—4 of FIG. 2;

FIG. 5 is a fragmentary view taken substantially along the line 5—5 of FIG. 2;

FIG. 6 is a fragmentary sectional view taken substantially along the line 6—6 of FIG. 3.

Body 11 of the present invention has an internally threaded inlet end 12 into which fits a hollow end plug 13 which is internally threaded to connect to any desired fitting. In the middle of the body 11 is a reduced diameter portion 14 having a seat 16 at the inlet end thereof. The outlet end 17 of body 11 is preferably externally threaded for connection to a nozzle or other device. Adjacent, but spaced inwardly from outlet end 17, is a transverse bore 18. Flats 19 are formed on the exterior of body 11 adjacent bore 18.

Secured for oscillation in the transverse bore 18 is a valve stem 21 which adjacent either end is circular in cross-section, but has a square shape 22 at one end and a round shape 23 at the opposite end. The central portion 24 of stem 21 is cut away to provide merely an approximately 90° sector 26 which functions as a cam. The stem 21 is suitably grooved to receive seals 27 which seal the stem 21 to the bore 18.

On the exterior of body 11 is a handle 31 which is suitably shaped for gripping in such manner that, by inserting the fingers of the user under the body 11 and compressing, the handle may be turned from solid line position of FIG. 1 to dot-and-dash line position, a movement of approximately 22°. Handle 31 is formed with offsets 32 of a clevis shape which fit along either of the flats 19. One offset 32 is formed with a square hole 33 to received end 22 and the opposite offset 32 is formed with a round hole 34 to receive the round end 23 of stem 21. Washer 36 and screw 37 hold the stem 21 assembled within the bore 18 and also secure the offsets 32 in place. It will be seen by reason of the shape of hole 33 and end 22 that compression of the handle 31 turns the stem 21 through approximately 22 degrees of movement.

Within the longitudinal bore 14 is a valve actuator 41 which is round in cross-section, but has two long vanes 42 and two short vanes 43 which extend out from the central portion of the actuator 41 and center the actuator 41 within the bore 14 in the manner of a spider. As is apparent from FIG. 2, in the closed position of the valve, the shorter vanes 43 do not engage the stem 21 whereas the longer vanes 43 fit into the opening in the central portion 24 where it has been cut away to leave only the sector or cam 26. The nose 44, or outlet directed end of the actuator 41 engages the cam 26.

At the inlet end of the actuator 41 is a washer 46 which seats against the chamfered seat 16. The washer 46 is held in place on the actuator 41 by screw 47 which is threaded into a tapped hole in the left end of the actuator as viewed in the drawings. A conical spring 48 bears against washer 46. It will be seen from FIGS. 2 and 3 that the end plug 13 has a smaller diameter than the end 12, thereby providing a shoulder against which the inlet end of spring 48 bears.

Directing attention FIG. 1, it will be seen that various fittings may optionally be attached to the valve. Thus, as shown in the drawings there is an inlet fitting 51 which is threaded into the end plug 13 and is connected to a hose or other of water or fluid pressure and there is an outlet fitting 52, such as a spray nozzle which may be internally threaded and engages the threads on the exterior of outlet end 17.

In the operation of the valve, with the handle 31 in the upward position of FIG. 1, the central portion of stem 21 is as shown in FIGS. 2 and 5, that is, the nose 44 of actuator 41 is flush against one of the radial sides of sector 26. The nose 44 is pushed against cam 26 by reason of the force of spring 42 and the pressure of fluid behind the washer 46. When the valve handle 31 is depressed to the dot-and-dash position of FIG. 1, the stem 21 turns through approximately 22° to the position of FIG. 6. In such position, the radial side of the sector 26 forces the nose 44 to the left against the force of spring 48 and fluid pressure, unseating the washer 46 from the seat 16. This permits fluid to flow from the inlet plug 13 through the inlet end 12, around the space between the washer 46 and seat 16 and down the bore 14—i.e., in the space between the central portion of the actuator 41 and bore 14 not occupied by the vanes 42,43. Since only 90° of the central portion of the stem 21 remains and the rest has been cut away, there is no obstruction to flow of the fluid past the stem 21 and out the end 17. When the operator relaxes his grip on the handle 31, spring 48 and fluid pressure return the parts to the position shown in FIG. 2.

It will be seen that only one hand is required to actuate the handle 31 and hold the body 11 and that the operation of the valve is extremely quick.

The valve has been illustrated and described in a mode where depressing the handle 41 opens the valve. It will be readily understood by one skilled in the art that the same operation of the handle may be used to close the valve merely by different orientation of the square end 22 of the stem 21 and the square hole 33 of the handle offset 32. Such a reversal of operation is desirable in use of the valve in equipment where the valve is normally open and it is only necessary occasionaly to close the valve. A typical such installation is in steam cleaning of carpets and upholstery.

What is claimed is:

1. A valve comprising a body having intersecting longitudinal and transverse bores, said longitudinal bore being formed with an inlet port at one end, a seat inward of said inlet port, a cylindrical reduced diameter portion inward of said seat and an outlet port on other end of said body, a stem in said transverse bore, a handle external to said body movable by squeezing action between a first position at an angle to the exterior of said body and a second position substantially parallel to said body, stem turning means for turning said stem as said handle moves from first and second positions, a portion of said stem being formed at the intersection of said bores in a cam, said cam portion of said stem being initially circular in cross-section and being cut away through approximately 270° to form said cam as a sector of a circle of about 90°, an actuator reciprocable in said longitudinal bore having a seat-engaging means at one end engageable with said seat to close said valve, a cam follower at the opposite end of said actuator to engage said cam, said cam follower in the closed position of the valve engaging a radial side of said sector, said cam follower in the open position of the valve engaging a peripheral corner of said sector, a substantial portion of said stem being cut away to form said cam, the cut-away portion permitting fluid flow around said cam when the valve is open, said actuator being substantially smaller than said reduced diameter portion and having spacing means intermediate said ends comprising vanes engaging the walls of said reduced diameter portion permitting fluid flow between said actuator and said reduced diameter portion, said cam forcing said actuator toward said inlet port to move said seat engaging means off said seat to open said valve when said handle is in second position, and spring means biasing said actuator to close said valve.

2. A valve according to claim 1 in which at least one end of said stem is non-circular and said handle has offsets on either side of said body with holes shaped to receive and engage said ends of said stem, said ends and holes comprising said stem-turning means.

* * * * *